United States Patent [19]
Hiraiwa et al.

[11] Patent Number: 5,387,268
[45] Date of Patent: Feb. 7, 1995

[54] SINTERED ALUMINA ABRASIVE GRAIN AND ABRASIVE PRODUCTS

[75] Inventors: Tadashi Hiraiwa; Fumiyoshi Ono, both of Nagano, Japan

[73] Assignee: Showa Denko Kabushiki Kaisha, Tokyo, Japan

[21] Appl. No.: 75,569
[22] PCT Filed: Oct. 16, 1992
[86] PCT No.: PCT/JP92/01352
§ 371 Date: Jun. 16, 1993
§ 102(e) Date: Jun. 16, 1993
[87] PCT Pub. No.: WO93/08138
PCT Pub. Date: Apr. 29, 1993

[30] Foreign Application Priority Data
Oct. 16, 1991 [JP] Japan ................. 3-296375
[51] Int. Cl.$^6$ .............. C09C 1/68; C04B 35/10
[52] U.S. Cl. .................. 51/309; 501/120; 501/127
[58] Field of Search ............ 501/120, 127; 51/309

[56] References Cited
U.S. PATENT DOCUMENTS
4,314,827  2/1982  Leitheiser et al. ............. 51/309
4,906,255  3/1990  Nikitina et al. ............... 51/309

*Primary Examiner*—Mark L. Bell
*Assistant Examiner*—Deborah Jones
*Attorney, Agent, or Firm*—Sughrue, Mion, Zinn, Macpeak & Seas

[57] ABSTRACT

A sintered alumina abrasive grain comprised of alpha-alumina crystals and a spinel crystalline phase which does not form a continuous phase but is in the form of discrete crystals which are deposited on triple points in alumina crystal boundaries and are substantially uniformly distributed over the abrasive grain. Preferably, the alpha-alumina crystals have an average particle diameter not larger than 1 micron, and the spinel crystalline phase is composed of alumina and an oxide of a metal selected from Ni, Mg and Zn.

9 Claims, 1 Drawing Sheet

SINTERED ALUMINA ABRASIVE GRAIN AND ABRASIVE PRODUCTS

TECHNICAL FIELD

This invention relates to a sintered alumina abrasive grain comprised of alpha-alumina crystals and having a microcrystalline structure, and to a grinding wheel and other abrasive products made of the sintered alumina abrasive grain.

The abrasive grain of the invention has high hardness and toughness, and therefore, a grinding wheel, a coated abrasive, and other abrasive products made of the abrasive grain have excellent grinding performances.

BACKGROUND ART

Grinding performances of a sintered alumina abrasive grain are generally enhanced with a decrease of crystal size and an increase of hardness thereof. It is known that, to make microcrystals, magnesium oxide as a sintering aid is added into alumina whereby a magnesium spinel is formed at the crystalline grain boundaries. Further, in Japanese Unexamined Patent Publication No. 56-32369, it has been proposed that, in a process for making an abrasive grain by a sol-gel method, cobalt, hafnium, magnesium, nickel, zinc, zirconium or other metal is added to alumina prior to the step of a gel formation to yield a sintered alumina abrasive grain having a microcrystalline structure.

In Japanese Unexamined Patent Publication No. 60-231462, it has been proposed to dispersing finely divided alpha-alumina seeds in an alumina sol whereby a microcrystalline structure having a crystal size of a submicron order is obtained. In this publication, it is taught that an oxide of silicon, chromium, magnesium or zirconium may be added to an alumina gel.

In Japanese Unexamined Patent Publication No. 61-254,685, it has been proposed that, in a process for making an alumina abrasive grain by a sol-gel method, a nucleating agent such as alpha-alumina or alpha-ferric oxide is added to alumina prior to the drying step. It is taught in this publication that a precursor of an oxide of magnesium, zinc, cobalt, nickel, zirconium, hafnium, chromium or titanium may be added into an alumina gel dispersion.

In Japanese Unexamined Patent Publication No. 64-11184, it has been proposed that, in a process for making an alumina abrasive grain by a sol-gel method, an oxide of zirconium, hafnium, cobalt, nickel, zinc, magnesium and/or a rare earth metal element, or a precursor of the oxide is impregnated in a calcined alumina grain whereby an abrasive grain characterized in that the added metal element is distributed at a higher concentration on the surface and in the vicinity of the surface than that in the inner portion is obtained.

Sintered alumina abrasive grains having a microcrystalline structure can be produced by the above-proposed processes, but the uniformity of the microcrystalline structure and the hardness are not completely satisfactory. Therefore, there is an eager desire of abrasive grains having a uniform microcrystalline structure and a high hardness, and exhibiting excellent grinding performances.

DISCLOSURE OF INVENTION

In view of the foregoing, the object of the invention is to provide a sintered alumina abrasive grain which have characteristics desired for abrasives, especially excellent hardness and toughness and which provide abrasive products having excellent grinding performances.

In accordance with the present invention, there is provided a sintered alumina abrasive grain characterized as being comprised of alpha-alumina crystals and a spinel crystalline phase which does not form a continuous phase but is in the form of finely divided discrete crystals which are deposited on triple points in crystal boundaries and are substantially uniformly distributed over the sintered alumina abrasive grain.

Preferably, the alpha-alumina crystals have an average particle diameter of not larger than 1 micron, and the spinel crystalline phase is composed of alumina and an oxide of at least one metal element selected from nickel, magnesium and zinc.

In accordance with the present invention, there are further provided a grinding wheel, a coated abrasive, and other abrasive products, which are made of the above-mentioned sintered alumina abrasive grain.

BEST MODE FOR CARRYING OUT THE INVENTION

The abrasive grain of the present invention is a sintered alumina abrasive grain comprised of alpha-alumina crystals and a spinel crystalline phase which does not form a continuous phase but is in the form of finely divided discrete crystals, which are deposited on triple points in the crystal boundaries of the alpha-alumina microcrystalline structure. The spinel crystalline phase is composed of an oxide of the supported metal element and alumina, and is substantially uniformly distributed over the abrasive grain, i.e., there is no substantial difference in concentration of the spinel crystalline phase between the surface portion of the abrasive grain and the inner portion thereof.

Figure 1:
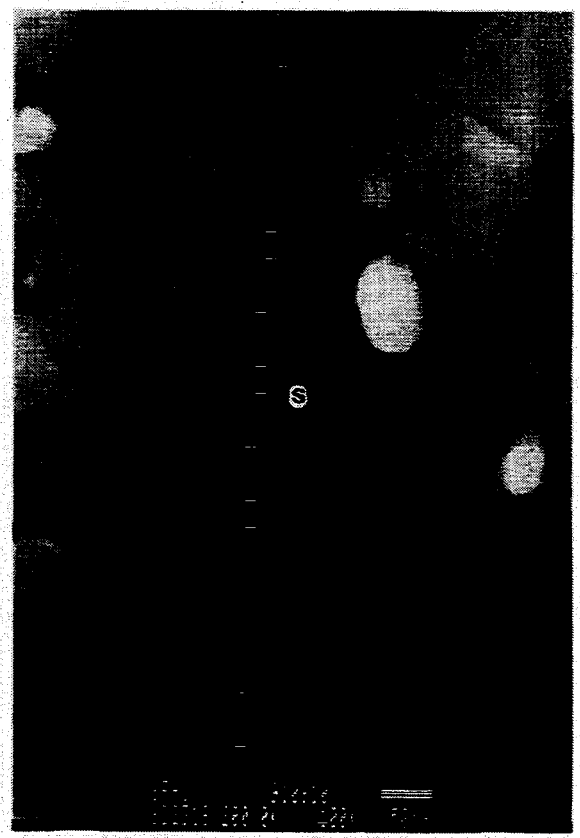
FIGS. 1 and 2 are transmission electron microscope (TEM) photographs showing a microstructure composed of alpha-alumina crystals and a spinel crystalline phase.

In the conventional sintered alumina abrasive grains having a spinel crystalline phase, the spinel crystalline phase is present in the crystal boundaries of alpha-alumina crystals so that it forms a continuous phase in a manner such that it covers the alumina crystals. In contrast, in the sintered alumina abrasive grain of the invention, the spinel crystalline phase is in the form of discrete crystals deposited on triple points in crystal boundaries of the alpha-alumina crystals, as illustrated in FIG. 1, and the spinel crystalline phase is distributed without difference in concentration between the surface portion of the abrasive grain and the inner portion thereof, i.e., distributed substantially uniformly over the alumina abrasive grain. FIG. 1 is a TEM photograph (140,000 magnifications) of the sintered alumina abrasive grain of the invention made in Example 1, hereinafter described, wherein the black area with an indication "s", located in the center of the picture, is a crystal of the spinel phase, and the surrounding area is composed of alpha-alumina crystals.

The sintered alumina abrasive grain of the invention has a very high toughness and hardness. The toughness (as determined by the method as hereinafter described) is at least approximately 30%, the Vickers hardness (as determined at a load of 500 g) is at least approximately 20 Gpa, and the density is at least approximately 95% of the theoretical value. The reason for which the sintered alumina abrasive grain of the invention exhibits these high grinding performances is not clear, but it is presumed that, since the spinel crystalline phase of a finely divided particle form is present on triple points in the crystal boundaries within the alpha-alumina microcrystalline structure, the spinel crystalline phase functions as dispersed particles whereby the grinding performances are enhanced. More specifically, the spinel crystalline phase in the form of dispersed particles produces an enhanced compression stress due to the difference in thermal expansion, and cracks occurring in the abrasive grain when used are hindered from growing by the dispersed particles, or the cracks grow in deviating directions to a length such that fracture energy can be absorbed by the cracked portions and consequently a further growth of the cracks is hindered.

The alpha-alumina crystals of the sintered alumina abrasive grain of the invention are finely divided and substantially have a uniform size. The alpha-alumina crystals have an average particle diameter of not larger than 1 micron. Preferably, the average particle diameter is in the range of 0.8 to 0.05 micron and the largest particle diameter is not larger than 1 micron. More preferably, the average particle diameter is in the range of 0.3 to 0.05 micron and the largest particle diameter is not larger than 0.4 micron. Thus, the alpha-alumina crystals have approximately the same particle size. It is presumed that the fact that the alpha-alumina crystals are minute and uniform in size, as well as the fact that the spinel crystalline phase in the form of a finely divided discrete particle is deposited on triple points in the alpha-alumina crystals and is uniformly distributed, contribute to the enhancement of grinding performances.

The process for making the sintered alumina abrasive grain will now be described.

The sintered alumina abrasive grain of the invention can be made by a process which is a combination of a sol-gel method and an impregnation method. That is to say, pseudo-boehmite (for example, "SB Pural Alumina" supplied by Condea Co.) is mixed with nitric acid or other acids to form a sol. Then, a seed is added to the sol, and the sol is then converted to a gel. The seed used is finely divided alpha-alumina particles having a particle diameter not larger than 0.2 micron, preferably not larger than 0.1 micron, or finely divided particles of at least one metal oxide or precursor of a metal oxide selected from those which have a corundum type structure, such as $Ti_2O_3$, $MgO.TiO_2$, $FeO.TiO_2$, $NiO.TiO_2$, $CoO.TiO_2$, $MnO.TiO_2$, $ZnO.TiO_2$, $V_2O_3$, $Ga_2O_3$, $Rh_2O_3$ and alpha-$Fe_2O_3$, and a precursor of alpha-$Fe_2O_3$, or finely divided alpha-alumina particles into which at least one of the above-listed metal elements has been dissolved to form a solid solution.

Alternatively, the seed may be added to pseudo-boehmite and then an acid is added to the mixture to form a sol, and then the sol is converted to a gel.

The finely divided particles used as the seed are used preferably in an amount of 0.3 to 3% by weight based on the weight of alumina in the alumina sol. If the amount of the seed is smaller than 0.3% by weight, the alpha-alumina crystals of the abrasive grain are not minute. Even if the amount of the seed exceeds 3% by weight, the alpha-alumina crystals become minute only to a negligible extent.

The thus-prepared gel is then dried and the dry gel is pulverized and sieved to a desired particle size. The dry gel of the desired particle size is then calcined at a temperature not higher than 900° C. When the calcined particles are left to stand, the particles absorb moisture. However, the calcination of particles is carried out to an extent such that a predominant part, preferably at least 95% by weight, of the entire amount of water (i.e., the total of the free water and water of crystallization) is removed immediately after the calcination. If the calcination temperature exceeds 900° C., micro-pores are formed only to a minor extent within the calcined gel, and therefore, it is difficult or even impossible to allow the calcined gel to absorb a desired amount of a solution of a spinel crystal phase-forming component (which is hereinafter described). Especially, it becomes difficult that a desired amount of water is impregnated in the inside of the abrasive grain. Further, the amount of residual water in the calcined gel becomes undesirably large. If the percentage of water removal is less than 95%, similar difficulties are encountered.

Then, a solution of a salt of a metal element capable of forming a spinel together with alumina, i.e., at least one metal element selected from nickel, cobalt, magnesium, copper and zinc, is prepared, and the calcined gel is impregnated with the thus-prepared solution. When the solution-impregnated gel is sintered, the metal ion is converted to an oxide having a spinel type structure with alumina. Among the above-recited spinel-forming metal elements, nickel, magnesium and zinc are preferable. As the salts, there can be mentioned, for example, chloride, nitrate, sulfate, carbonate and acetate. As solvents in which the metal salts are dissolved, there can be mentioned, for example, water, ethanol, ether and acetone. Of these, a solvent having a low surface tension such as ethanol or methanol is preferable because of the enhanced effect of impregnation inside the abrasive grain. Water also is preferable for the cost consideration. It is preferable that the metal salt is used at a high concentration in proximity to the solubility. Therefore, the salts are dissolved preferably in water heated so that the solubility is enhanced. The calcined gel is impregnated with the solution containing the salt at a high concentration preferably by incorporating the calcined gel with the metal salt solution. More preferably, the metal salt solution is sprayed on the calcined gel.

The amount of the metal salt solution impregnated in the calcined gel is preferably 3 to 30% by weight, more preferably 5 to 20% by weight, expressed in terms of the amount of alumina spinel. If the amount of the impregnated metal salt solution is small and the amount of alumina spinel is smaller than 3% by weight, the amount of spinel crystals deposited on triple points in the crystal boundaries is too small and the resulting abrasive grain has a poor toughness. If the amount of the impregnated metal salt solution is large and the amount of alumina spinel is larger than 30% by weight, the resulting abrasive grain has a poor hardness.

The calcined gel impregnated with the metal salt solution is dried. The method and conditions employed are important for the production of the abrasive grain of the invention. Namely, by appropriately selecting the method and conditions employed for drying, the abrasive grain of the invention is obtained which is characterized in that the spinel crystalline phase does not form a continuous phase covering alpha-alumina crystals, but is in the form of finely divided discrete crystals which are deposited on triple points in crystal boundaries and are substantially uniformly distributed over the abrasive grain without any signicant difference in concentration between the surface portion of the grain and the inner portion thereof. This is in sharp contrast to the abrasive grain taught in Japanese Unexamined Patent Publication No. 64-11184 which is characterized in that the concentration of the metal added in the surface portion is higher than that in the inner portion. Due to the specific microstructure, the abrasive grain of the invention exhibits very enhanced abrasive performances.

The method and conditions for drying will be described in detail.

It is essential for making the abrasive grain of the invention to employ a drying method such that the solution impregnated in the grain of calcined gel is not transferred within the grain during drying. A typical example of the drying method is a freeze-drying method. In the freeze-drying mehod, the impregnated solution is frozen to solid state and water sublimes from the solid, and thus, the solution is not transferred within the grain. Namely, the spinel-forming component is supported without transfer as it is impregnated within the grain, and therefore, there arises no difference in concentration of spinel between the surface portion of the grain and the inner portion thereof.

Another example of the drying method for making the abrasive grain of the invention is a drying method wherein the solution-impregnated grain is dried in a state such that the water content in the capillaries existing uniformly over the entire grain of calcined gel. That is to say, the solution-impregnated grain is dried at a water content lower than the critical water content which is the threshold value between the constant-rate drying period during which the water content decreases in proportion to the drying time (i.e., the reduction rate of the water content is approximately constant) and the decreasing-rate drying period during which the reduction rate of the water content decreases with drying time. By drying the solution-impregnated grain at a water content lower than the critical water content, the transfer of the impregnated solution within the grain is minimized and thus nonuniform deposition of the spinel-forming component can be avoided. Such drying can be achieved by using a salt solution containing a salt at an as high concentration as possible (i.e., containing the minimum amount of water), or by drying the solution-impregnated calcined gel grain in a manner such that the constant-rate drying period is shortened as much as possible. When the gel is calcined at a temperature not higher than 900° C., the resulting gel is comprised of gamma-alumina which has a critical water content of about 40% by weight (dry base). Therefore, when an impregnated calcined gel containing 40% by weight or more of water is dried, a rapid drying procedure should be employed such that the critical water content is reached as early as possible to avoid nonuniform deposition of the spinel-forming component. This rapid drying procedure can be conducted by, for example, fluidized drying, rotary drying or stirring drying.

The calcined gel is thoroughly dried by the above-mentioned method and the above-mentioned conditions so that nonuniform deposition of the spinel-forming component does not occur. The drying temperature varies depending upon the particular solvent used for the preparation of a salt solution. Preferably, the drying is carried out at a relatively low temperature because, when the drying temperature becomes close to the boiling point, nonuniform deposition tends to occur.

After the drying, if desired, the dried gel is re-heated to a calcination temperature which is below 900° C., to remove the anion component such as $Ci^-$, $NO_3^-$, $SO_4^{2-}$, $CO_3^{2-}$ or other anions.

Thereafter, the dried calcined gel is sintered in a furnace such as, for example, a rotary kiln. The heating is carried out under conditions such that the highest temperature is in the range of 1,100° to 1,400° C., and preferably, the gel is rapidly heated so as to pass through the temperature zone spanning from 900° to 1,100° C. within 90 seconds. By the rapid heating, the phase conversion of from gamma-alumina to alpha-alumina suddenly occurs and densification of the sintered structure is promoted and hardness thereof is enhanced.

The higher the sintering temperature, the shorter the time for which the calcined gel is maintained at the sintering temperature. For example, when the sintering temperature is 1,400° C. and 1,100° C., the time is preferably about 20 seconds and about 10 hours, respectively. In general, when the sintering temperature is 1,200° to 1,300° C., the time is preferably 30 seconds to 10 minutes, and, when the sintering temperature is 1,100° to 1,200° C., the time is preferably 10 minutes to 10 hours. A two stage heating procedure may be adopted wherein the calcined gel is maintained at a temperature of 1,100° to 1,300° C. for 30 seconds to 10 minutes, and then maintained at a temperature of 1,000° to 1,200° C. for 1 to 100 hours. When the highest sintering temperature exceeds 1,400° C., hardness of the sintered product can be at least about 20 GPa, but it becomes difficult to lower the average particle diameter of the alpha-alumina crystals below 1.0 micron. When the highest sintering temperature is lower than 1,100° C., the average particle diameter of the alpha-alumina crystals can be lower than 0.2 micron, but hardness of the sintered product is lower than 18 GPa and the density thereof is lower than 95% of the theoretical value.

After the above-mentioned sintering, the sintered product is cooled to room temperature, and pulverized and sieved to a predetermined grain size whereby an abrasive grain having the desired grain size is obtained.

The grinding wheel is made by adding a binder such as vitrified bond, metal bond or resin bond to the abrasive grains, and molding and curing the mixture. Of these binders, vitrified bond is preferable. The vitrified bond is generally called as frit and is prepared by blending together feldspar, porcelain stone, borax, clay and others. The vitrified bond comprises $SiO_2$, $B_2O_3$, $Al_2O_3$, $Fe_2O_3$, CaO, MgO, $Na_2O$, $K_2O$ and others. A vitrified grinding wheel is made by blending the sintered alumina abrasive grains with the vitrified bond binder and a minor amount of a sizing agent such as dextrin, press-molding the mixture, drying the molded product, and firing the molded product. The firing is carried out preferably at a temperature of 950° to 1,150° C. so that the crystals do not become coarse.

The coated abrasive is made by binding a substrate with the abrasive grains by using a binder. A phenolic resin binder is preferable in view of good grinding performances and water resistance. The curing conditions employed can be mitigated by adding resorcinol or derivatives thereof.

As specific examples of the substrate of the coated abrasives, there can be mentioned paper, woven fabrics and non-woven fabrics.

The invention will be described specifically by the following examples.

EXAMPLE 1

In 2 liters of water, 600 g of pseudo-boehmite (SB Pural Alumina supplied by Condea Co.) was dispersed, and 225 ml of an aqueous dispersion containing as a seed 3.72 g of finely divided $NiTiO_3$ (NiO.TiO) particles ($d_{50}=0.038$ micron) (which amount corresponds to 0.62% by weight based on the weight of alumina in a resulting alumina sol) was added to the aqueous dispersion. Further, a mixed solution of 37.5 ml of an aqueous 70% $HNO_3$ solution with 112.5 ml of water was added to the aqueous dispersion to prepare an alumina sol. The alumina sol was dried at a constant temperature of 120° C. for 24 hours in a vat made of SUS to prepare a dry alumina gel. The dry gel was pulverized and sieved into particles having a particle diameter of 500 to 350 micron. This particle size corresponds to a final abrasive grain having a grain size of #60 in JIS R6001-1973.

The alumina particles were calcined at 750° C. for 15 minutes to remove residual water, water of crystallization and $HNO_3$. The water content was 3% by weight. The calcined gel was pulverized, and the obtained finely divided gel was proved to be composed of gamma-alumina by the powder X-ray diffractometry. The calcined gel had a specific surface area of 200 $m^2/g$ and was a porous body having microvoids.

In 110 ml of water, 22.8 g of $Ni(NO_3)_2.6H_2O$ was dissolved. The resultant aqueous solution was combined with 150 g of the calcined alumina gel. The mixture was treated by using a rotary type mixer at room temperature and at 60 r.p.m. for 30 minutes whereby Ni ion was impregnated in microvoids of the calcined gel. Thereafter, the impregnated calcined gel was treated at 50° C. in the same rotary type mixer for 3 hours whereby the impregnated calcined gel was dried. The Ni-impregnated calcined gel was rapidly heated from room temperature in 60 seconds in a rotary kiln and was maintained at 1,300° C. for 2 minutes, and then heat-treated at 1,075° C. for 10 hours in a muffle furnace.

The resultant abrasive grain had a density of 3.96 $g/cm^3$ (which corresponds to 98.3% of the theoretical value), and a Vickers hardness of 24.5 GPa as measured at a load of 500 g. The alumina crystals had an average particle diameter $d_{50}$ of 0.15 micron and a maximum diameter of 0.24 micron, and the content of spinel crystals in the abrasive grain was 9.0% by weight.

The toughness of the abrasive grain was determined as follows. Among the abrasive grains having a grain size of 350 to 250 micron which correspond to #60 of JIS-R6001-1973, abrasive grains having a grain size of 300 to 250 micron were collected in an amount of 0.4 g. The collected abrasive grain and one steel ball having a diameter of 6 mm were put in a steel capsule having a volume of 2.0 ml, and the abrasive grain was pulverized at 3,000±100 r.p.m. for 30 seconds and sieved by a sieve having a mesh size of 127 micron. The toughness was expressed in terms of the percentage by weight of residual abrasive grains on the sieve. The larger the percentage, the higher the toughness. The toughness of the abrasive grain prepared in this example was 38%, i.e., much higher than those of conventional alumina abrasive grains.

The prepared alumina abrasive grain was fixed on a brass column having a diameter of 10 mm and a height of 10 mm by using an adhesive (Aronalpha), and abraded so that the inside of the abrasive grain was exposed. The final abrasion was conducted by using a #8000 diamond slurry. The analysis of the spinel crystals by EPMA revealed that nickel spinel is uniformly distributed over the abrasive grain.

Figure 2:
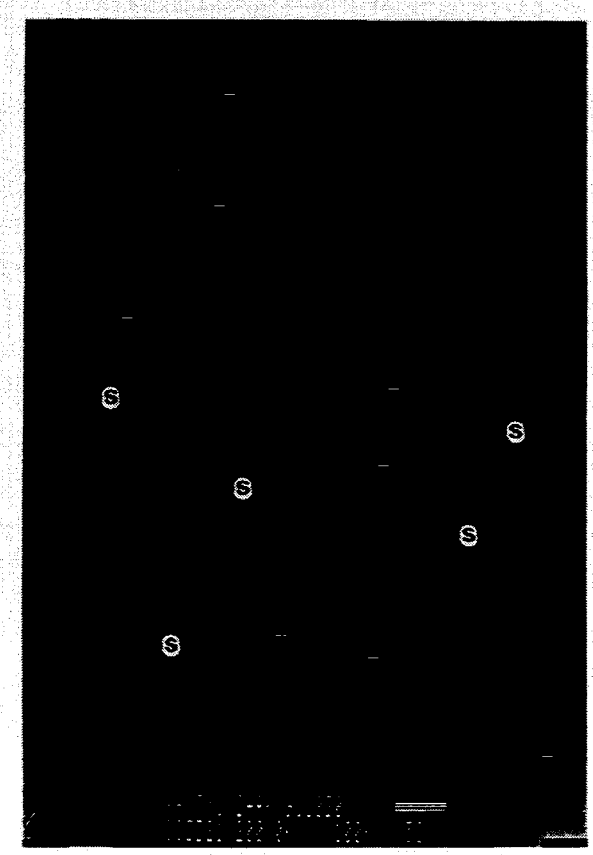

The abrasive grain was embedded in a resin and subjected to dimpling to a thickness of 40 micron. Then the dimpled sample was subjected to ion thinning and supported on a single hole mesh of molybdenum. The microstructure of the thus-prepared sample was analyzed by TEM. As seen from FIG. 1 and FIG. 2, the spinel crystalline phase was in the form of finely divided discrete particles and is deposited on triple points in crystal boundaries of the alumina crystals having a particle diameter not larger than 1 micron.

EXAMPLE 2

An abrasive grain was prepared by the same procedures as those employed in Example 1 except that Mg was used as a spinel-forming metal element instead of Ni, i.e., 48.3 g of $Mg(NO_3)_2.6H_2O$ was used. The resultant abrasive grain had characteristics shown in Table 1. Observation of the abrasive grain by TEM and analysis thereof by EPMA revealed that the Mg crystalline phase was present on triple points in the alumina crystal boundaries and there was no difference in concentration of the Mg crystalline phase between the surface portion of the abrasive grain and the inner portion thereof.

EXAMPLE 3

An abrasive grain was prepared by the same procedures as those employed in Example 1 except that Zn was used as a spinel-forming metal element instead of Ni, i.e., 21.1 g of $Zn(NO_3)_2.6H_2O$ was used. The resultant abrasive grain had characteristics shown in Table 1.

It was found by the same analysis as in Example 1 that the Zn spinel crystalline phase was present on triple points in the alumina crystal boundaries, and nonuniformity in concentration of the Zn crystalline phase in the abrasive grain was not found.

EXAMPLES 4 AND 5

Finely divided $NiTiO_3$ particles were used in an amount of 2.48 g (which corresponds to 0.41% by weight based on the weight of alumina in a resulting alumina sol) in Example 4, and 4.96 g (which corresponds to 0.83% by weight based on the weight of alumina in a resulting alumina sol) in Example 5. 225 ml of an aqueous dispersion containing the $NiTiO_3$ particles was added, and #60 abrasive grains were prepared by the same procedures as those described in Example 1. The abrasive grains had characteristics shown in Table 1.

It was found by the same analysis as in Example 1 that the Ni spinel crystalline phase was present on triple points in the alumina crystal boundaries, and nonuniformity in concentration of the Ni crystalline phase in the abrasive grains was not found.

EXAMPLE 6

An abrasive grain was prepared by the same procedures as those employed in Example 1 except that finely divided alpha-alumina particles were used as a seed instead of finely divided $NiTiO_3$ particles. Namely, 45 ml of an aqueous dispersion containing 6.0 g of finely divided alpha-alumina particles having a specific surface area of 52 $m^2/g$ (which amount corresponds to 1.0% by weight based on the weight of alumina in a resulting alumina sol). The resultant abrasive grain had characteristics shown in Table 1.

It was found by the same analysis as in Example 1 that the spinel crystalline phase was present on triple points in the alumina crystal boundaries, and nonuniformity in concentration of the crystalline phase in the abrasive grain was not found.

COMPARATIVE EXAMPLE 1

An abrasive grain was prepared by the same procedures as those described in Example 1 except that the calcined alumina gel was not impregnated with an aqueous solution of a spinel-forming metal salt. The resultant abrasive grain had characteristics shown in Table 1.

COMPARATIVE EXAMPLE 2

An abrasive grain was prepared in accordance with the working example of Japanese Unexamined Patent Publication No. 60-231462 as follows.

In a beaker, 200 g of pseudo-boehmite (SB Pural Alumina supplied by Condea Co.) and 1.5 ml of water were mixed together, and 0.3 ml of an aqueous 3.6% by weight $HNO_3$ solution was added to the mixture whereby the pH value became 2 and the mixture became sol.

An alumina pot having a volume of 7.3 liter was charged with 7 kg of alumina balls and 1.5 liter of water, and rotated at 60 r.p.m. for 96 hours whereby an aqueous slurry containing an alumina powder produced by grinding. The alumina powder had a specific surface area of 75 $m^2/g$.

The aqueous slurry containing 9.0 g of the alumina powder (which corresponds to 1.5% by weight based on the weight of alumina in the alumina sol) was added to the alumina sol and the mixture was stirred for 24 hours. Then the alumina sol was transferred into a vat, and dried at 80° C. for 48 hours and then at 120° C. for 24 hours. After the drying, the dry gel was pulverized and sieved into a regulated particle size such that the final product is #60 abrasive grains having a particle diameter of 350 to 250 micron. The dry gel of such a regulated particle size was heat-treated at 750° C. for 1 hour to remove $NO_x$ ingredients derived from $HNO_3$, and then sintered at 1,400° C. for 1 minute in a rotary kiln. The resulting abrasive grains had characteristics shown in Table 1.

COMPARATIVE EXAMPLE 3

An abrasive grain was prepared in accordance with the working example of Japanese Unexamined Patent Publication No. 64-11184 as follows.

A calcined alumina gel was prepared by the same procedures as those described in Example 1 except that the seed, i.e., finely divided $NiTiO_3$ particles, was not used.

A glass flask having a volume of 1,000 ml was charged with 500 g of an aqueous 15 wt. % nickel nitrate solution, and then 150 g of the calcined alumina gel was added into the flask. The flask was corked and vacuumized by an aspirator. The content was maintained under a reduced pressure for 1 minute to remove the air from the calcined gel and impregnate the voids with the aqueous nickel nitrate solution. Thereafter the content was filtered by using a No. 4 filter to remove the excessive nitrate solution, and the powdery gel was dried at 100° C. in a forced air oven.

The dried gel was calcined in a manner similar to that employed in Example 1 of Japanese Unexamined Patent Publication No. 64-11184 using an apparatus having an inlet temperature of 350° C. and an outlet temperature of 800° C., and further heat-treated at 1,380° C. for 5 minutes in a kiln. The resultant abrasive grain had characteristics shown in Table 1.

The same analysis and observation of the abrasive grain as in Example 1 revealed that the Ni spinel crystalline phase was present on triple points in the alumina crystal boundaries, in a state such that the Ni spinel crystalline phase forms a continuous phase covering the alumina crystals, and was not found on triple points in crystal boundaries. The concentration of the Ni spinel crystalline phase in the surface portion of the abrasive grain was 1.5 to 2.0 times of the concentration thereof in the inner portion of the grain.

COMPARATIVE EXAMPLE 4

An abrasive grain was prepared by the same procedures as described in Comparative Example 3 except that finely divided $NiTiO_3$ particles were used as a seed in a manner similar to that in Example 1. The resultant abrasive grain had characteristics shown in Table 1.

The same analysis and observation of the abrasive grains as those in Example 1 revealed that the content of the Ni spinel crystalline phase varied among abrasive grains, and the content thereof was in the range of 0.5 to 30% by weight. The average content of the Ni spinel crystalline phase was 9.0% by weight. The Ni spinel crystalline phase was present in crystal boundaries in the surface portion of the abrasive grain in the state of a continuous phase covering the alumina crystals. The spinel phase also was present on triple points in crystal boundaries in the surface portion of the grain. The spinel phase was present only on triple points in crystal boundaries in the inner portion of the grain. The concentration of the spinel phase in the surface portion of the grain was 1.5 to 2.0 times of the concentration thereof in the inner portion of the grain.

COMPARATIVE EXAMPLE 5

A calcined gel was prepared by the same procedures as those in Example 1 and the gel was impregnated with an aqueous nickel nitrate solution. Thereafter, in contrast to Example 1, the impregnated gel was transferred into a vat made of SUS and dried at 50° C. for 24 hours in a forced hot air oven in a stationary state. Then the dried gel was treated in the same manner as in Example 1 to obtain an abrasive grain. The resultant grain had characteristics shown in Table 1.

The same analysis and observation as in Example 1 revealed that the state of the Ni spinel crystalline phase and the difference in concentration of the Ni spinel crystalline phase between the surface portion of the grain and the inner portion thereof were similar to those in Comparative Example 4.

TABLE 1

| | Density | | Characteristics of Abrasive Grains | | Content of spinel in abrasive grain (wt %) | Vickers hardness (load = 500 g) (GPa) | Toughness (%) |
|---|---|---|---|---|---|---|---|
| | | | Alumina crystals in abrasive grain | | | | |
| | ($g/cm^3$) | % Based on theoretical value | Average diameter $d_{50}$ (μm) | Maximum diameter (μm) | | | |
| Example 1 | 3.96 | 98.3 | 0.15 | 0.25 | 9.0 | 24.5 | 38 |
| Example 2 | 3.86 | 98.7 | 0.17 | 0.27 | 17.4 | 23.1 | 37 |
| Example 3 | 3.99 | 99.0 | 0.19 | 0.29 | 8.3 | 23.7 | 30 |
| Example 4 | 3.91 | 97.0 | 0.17 | 0.26 | 9.0 | 24.1 | 37 |
| Example 5 | 3.97 | 98.5 | 0.16 | 0.30 | 9.0 | 24.9 | 36 |
| Example 6 | 3.98 | 98.8 | 0.15 | 0.25 | 9.0 | 24.1 | 35 |
| Comparative Example 1 | 3.83 | 96.2 | 0.24 | 0.47 | 0.0 | 21.9 | 12 |
| Comparative Example 2 | 3.89 | 97.7 | 0.30 | 0.50 | 0.0 | 22.5 | 13 |
| Comparative Example 3 | 3.78 | 93.8 | 0.51 | ca. 5.0 | 9.0 | 19.5 | 8 |
| Comparative Example 4 | 3.90 | 96.8 | 0.16 | 0.34 | 9.0 | 22.0 | 21 |
| Comparative Example 5 | 3.90 | 96.8 | 0.21 | 0.33 | 9.0 | 22.5 | 20 |

EXAMPLES 7-12

100 parts by weight of #60 abrasive grain prepared in each of Examples 1 to 6 was mixed together with 13 parts by weight of borosilicate frit as a vitrified grinding wheel bond, 2 parts by weight of dextrin and 2.5 parts by weight of water. The borosilicate frit used was composed of 70% by weight of $SiO_2$, 7% by weight of $Al_2O_3$, 18% by weight of $B_2O$, 4% by weight of ($Na_2O + K_2O$) and 0.5% by weight of (CaO+MgO). The mixture was press-molded to give a molding having a grain ratio of 45%. The molding was dried at 110° C. and then fired at 1,050° C. for 20 hours. Then the fired molding was cooled wherein it was slowly cooled at least in the region of 500° to 600° C. and thereafter allowed to stand at room temperature whereby a vitrified grinding wheel with a grade K as determined in JIS R6210 was obtained. The grinding wheels made from the abrasive grains prepared in Examples 1 to 6 had a size of 200 mm × 19 mm × 76.2 mm. These grinding wheels are marked with Examples 7 to 12.

Grinding performances of the vitrified grinding wheels were evaluated under the following test conditions.

Test conditions:
Machine: Okamoto Surface Grinding Machine CFG-52 (3.7 kW)
Grinding method: plunge grinding, down-cut, manual infeed
Ground material: SUJ-2 ($H_{RC}60$)
  100 mm length × 50 mm height × 10 mm thickness
Peripheral speed of grinding wheel: 2,000 m/min.
Table speed: 20 m/min.
Cut depth: $\Delta^R$ 20 micron/pass
Total cut depth: 5 mm
Grinding width: 10 mm
Spark out: 1
Grinding fluid: Noritake-cool K-82B (water-soluble grinding fluid)
Dressing conditions:
  Single diamond dresser
  Cut depth: ΔR20 micron/pass
  Lead: 0.2 mm/r.p.m.
  Spark out: zero

COMPARATIVE EXAMPLES 6-10

Using #60 abrasive grains prepared in Comparative Examples 1 to 5, vitrified grinding wheels (having the same size as that made in Example 7) were made by the same procedures as those described in Example 7.

Grinding performances of the vitrified grinding wheels were evaluated under the same test conditions as those described in Examples 7 to 12. The grinding ratio, maximum power consumption (unloading power consumption (0.4 kW) was deducted) and surface roughness are shown in Table 2.

TABLE 2

| Grinding wheel made in: | Abrasive grain made in: | Grinding ratio ($mm^3$/$mm^3$) | Maximum power consumption (kW/cm) | Surface roughness (μRZ) |
|---|---|---|---|---|
| Example 7 | Example 1 | 218 | 1.1 | 4 |
| Example 8 | Example 2 | 200 | 1.1 | 5 |
| Example 9 | Example 3 | 125 | 1.3 | 7 |
| Example 10 | Example 4 | 165 | 1.2 | 5 |
| Example 11 | Example 5 | 142 | 1.1 | 6 |
| Example 12 | Example 6 | 170 | 1.2 | 5 |
| Comparative Example 6 | Comparative Example 1 | 70 | 1.5 | 19 |
| Comparative Example 7 | Comparative Example 2 | 75 | 1.3 | 18 |
| Comparative Example 8 | Comparative Example 3 | 20 | 1.8 | 15 |
| Comparative Example 9 | Comparative Example 4 | 120 | 1.5 | 16 |
| Comparative Example 10 | Comparative Example 5 | 140 | 1.4 | 16 |

As seen from Table 2, the grinding wheels made from the abrasive grains of the invention exhibited grinding ratios which were about 2 to 3 times larger than that of the grinding wheel (Comparative Example 7) made from the abrasive grain (Comparative Example 2) prepared by the process described in Japanese Unexamined Patent Publication No. 60-231462; which were about 2 to 3 times larger than that of the grinding wheel (Comparative Example 6) made from the abrasive grain (Comparative Example 1) having no spinel crystalline crystals; which were about 7 to 11 times larger than that of the grinding wheel (Comparative Example 8) made from the abrasive grain (Comparative Example 3) prepared by the same method as in a working example of Japanese Unexamined Patent Publication No. 46-11184; and which also was larger than that of the grinding wheel (Comparative Example 9) made from the abrasive grain (Comparative Example 4) prepared by the same method as in Comparative Example 3 except that a seed was used.

In spite of that the grinding performances are good, the grinding wheels made from the abrasive grains of the invention exhibited maximum power consumption lower than those of the comparative examples and surface roughnesses smaller than those of the comparative examples. Further, burn marks were found in the grinding wheels of the comparative examples, but were not found in the grinding wheels of the invention (Examples 7-12). Thus, it will be seen that the abrasive grain of the invention is much superior to conventional abrasive grains in various grinding performances.

EXAMPLE 13

In 10 parts by weight of ethanol, 10 parts by weight of resorcinol was dissolved. The thus-obtained solution was mixed with 100 parts by weight of #60 abrasive grain of the invention prepared in Example 1, and the mixture was maintained at 100° C. for 1 hour to remove ethanol by evaporation whereby an abrasive having a resorcinol coating was obtained.

A compressed non-woven fabric substrate was uniformly coated with a phenolic resin adhesive BRL-2867 (supplied by Showa Kobunshi K. K., solid content: about 70%) in an amount of 100 g/m². The above-mentioned resorcinol-coated abrasive was sprinkled on the adhesive-coated substrate and an excess abrasive was removed. The amount of the abrasive adhered onto the substrate was 250 g/m². The abrasive-adhered substrate was dried at 80° C. for 4 hours. Further, the phenolic resin adhesive was uniformly coated on the dried product in an amount of 200 g/m² and the coated product was dried at 80° C. for 4 hours. Then the temperature was elevated from 80° C. to 135° C. over a period of 2 hours and the coated product was maintained at 135° C. for 30 minutes whereby an abrasive cloth was obtained.

INDUSTRIAL APPLICABILITY

As seen from the working examples, the sintered alumina abrasive grain of the invention has good characteristics, especially enhanced hardness and toughness. A grinding wheel and other abrasive products made from the abrasive grain exhibit good grinding performances such as grinding ratio, power consumption and surface roughness. Therefore, the sintered alumina abrasive grain of the invention is useful for grinding wheels such as a vitrified grinding wheel and a resinoid grinding wheel, and coated abrasives such as an abrasive belt, a fiber disc and an abrasive cloth.

We claim:

1. A sintered alumina abrasive grain comprising 70 to 97% by weight of alpha-alumina crystals and 3 to 30% by weight of a spinel crystalline phase which does not form a continuous phase but which comprises finely divided discrete crystals which are deposited on triple points in crystal boundaries and are substantially uniformly distributed over the sintered alumina abrasive grain.

2. A sintered alumina abrasive grain as claimed in claim 1 wherein the spinel crystalline phase comprises alumina and an oxide of at least one metal element selected from the group consisting of nickel, cobalt, magnesium and zinc.

3. A sintered alumina abrasive grain as claimed in claim 1, wherein the spinel crystalline phase is composed of alumina and an oxide of at least one metal element selected from the group consisting of nickel, magnesium and zinc.

4. A sintered alumina abrasive grain as claimed in claim 1, wherein the alpha-alumina crystals have an average particle diameter of not larger than 1 micron.

5. A sintered alumina abrasive grain as claimed in claim 1, wherein the alpha-alumina crystals have an average particle diameter of 0.8 to 0.05 micron and a largest particle diameter not larger than 1 micron.

6. A sintered alumina abrasive grain as claimed in claim 1, which has a density of at least 95% of the theoretical value, a toughness of at least 30% as determined by a method described in the body of the specification, and a Vickers hardness of at least 20 GPa as measured at a load of 500 g.

7. An abrasive product comprising a sintered alumina abrasive grain, said abrasive grain comprising 70 to 97% by weight of alpha-alumina crystals and 3 to 30% by weight of a spinel crystalline phase which does not form a continuous phase but which comprises finely discrete crystals which are deposited on triple points in crystal boundaries and are substantially uniformly distributed over the sintered alumina abrasive grain.

8. An abrasive product as claimed in claim 7, which is a grinding wheel.

9. An abrasive product as claimed in claim 7, which is a coated abrasive.

* * * * *